United States Patent
Ang et al.

(10) Patent No.: US 7,973,768 B2
(45) Date of Patent: *Jul. 5, 2011

(54) OPTICAL NAVIGATION DEVICE WITH CONSOLIDATED PROCESSING FOR SURFACE AND FREE SPACE NAVIGATION

(75) Inventors: Jin Kiong Ang, Penang (MY); Wui Pin Lee, Penang (MY); Beng Chye Lye, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 686 days.

This patent is subject to a terminal disclaimer.

(21) Appl. No.: 11/941,896

(22) Filed: Nov. 16, 2007

(65) Prior Publication Data

US 2009/0128488 A1    May 21, 2009

(51) Int. Cl.
*G09G 5/00* (2006.01)
(52) U.S. Cl. .................. 345/167; 345/166; 345/158
(58) Field of Classification Search ........... 345/156–172
See application file for complete search history.

(56) References Cited

U.S. PATENT DOCUMENTS

| | | | |
|---|---|---|---|
| 4,131,367 A | 12/1978 | French et al. | |
| 5,596,387 A | 1/1997 | Takagi | |
| 5,786,804 A | 7/1998 | Gordon | |
| 5,847,695 A * | 12/1998 | Duncan et al. | 345/163 |
| 6,164,808 A * | 12/2000 | Shibata et al. | 700/85 |
| 6,229,913 B1 | 5/2001 | Nayar et al. | |
| 6,300,938 B1 * | 10/2001 | Culver | 345/156 |
| 6,525,306 B1 * | 2/2003 | Bohn | 250/221 |
| 7,061,468 B2 * | 6/2006 | Tiphane et al. | 345/158 |
| 2004/0246229 A1 | 12/2004 | Yamada | |
| 2005/0243062 A1* | 11/2005 | Liberty | 345/158 |

OTHER PUBLICATIONS

Avago Technologies, "ADNS-3060, High-performance Optical Mouse Sensor", Jan. 2007, p. 1-38.
Agilent Technologies, "ADNK-3061, Optical Mouse Designer's Kit", Nov. 8, 2004, p. 1-4.
Avago Technologies, "ADNS-3060, Optical Mouse Sensor", Sep. 16, 2006, p. 1-3.

* cited by examiner

*Primary Examiner* — Stephen G Sherman

(57) ABSTRACT

An optical navigation device for operation in a surface navigation mode and a free space navigation mode. The optical navigation device includes a microcontroller, a first navigation sensor, and a second navigation sensor. The first navigation sensor is coupled to the microcontroller, and the second navigation sensor is coupled to the first navigation sensor. The microcontroller processes a movement of the optical navigation device. The first navigation sensor generates a first navigation signal in a first navigation mode. The second navigation sensor generates a second navigation signal in a second navigation mode and sends the second navigation signal to the first navigation sensor. By implementing a navigation sensor to process signals from multiple navigation sensors, the cost and size of the optical navigation device can be controlled, and a small packaging design can be used.

14 Claims, 6 Drawing Sheets

OPTICAL NAVIGATION DEVICE WITH CONSOLIDATED PROCESSING FOR SURFACE AND FREE SPACE NAVIGATION

BACKGROUND OF THE INVENTION

Optical navigation sensors are conventionally used for surface navigation applications. For example, conventional optical navigation sensors are implemented in optical mouse devices for desktop computers. In surface optical navigation, the optical navigation sensor tracks the features of the navigation surface on which the device is moved.

More recently, optical navigation sensors have been used for free space navigation applications such as scene navigation. In some conventional embodiments, an optical navigation sensor for surface navigation is converted for use in free space applications by putting a wide angle lens on the optical sensor to track free space features. These conventional free space navigation devices are used for applications such as free-space presentation pointers and controllers. Other conventional technologies are also implemented to facilitate free space navigation operations. For example, some conventional free-space pointers use one or more mechanical gyroscopes (or gyro sensors) to provide navigation in the absence of surface features.

Despite the availability of individual surface and free space navigation devices, most conventional optical navigation devices do not provide the functionality of both surface and free space navigation capability in a single device. When a user gives a presentation, for example using a desktop computer, the user typically uses a mouse for desktop navigation and a separate pointer to navigate the presentation. The mouse provides surface navigation functionality, while the separate pointer provides free space navigation functionality.

For conventional optical navigation devices that integrate surface and free space navigation functionality, separate surface and free space navigation sensors are combined in a single package. However, many of the functional blocks on the surface navigation sensor and the free space navigation sensor are duplicated. Thus, the cost of such devices is unnecessarily high. Additionally, the form factor of conventional integrated optical navigation devices suffers from large packaging design. The form factor of conventional integrated optical navigation devices also suffers, in some instances, from irregularity and imbalance, in particular, because of the accommodations for the separate free space navigation sensor at the front of the optical navigation device.

SUMMARY OF THE INVENTION

An optical navigation device for operation in a surface navigation mode and a free space navigation mode is described. One embodiment of the optical navigation device includes a microcontroller, a first navigation sensor, and a second navigation sensor. The first navigation sensor is coupled to the microcontroller, and the second navigation sensor is coupled to the first navigation sensor. The microcontroller processes a movement of the optical navigation device. The first navigation sensor generates a first navigation signal in a first navigation mode. The second navigation sensor generates a second navigation signal in a second navigation mode and sends the second navigation signal to the first navigation sensor. By implementing a navigation sensor to process signals from multiple navigation sensors, the cost and size of the optical navigation device can be controlled, and a small packaging design can be used. Other embodiments of the optical navigation device are also described.

A surface navigation sensor is also described. Embodiments of the surface navigation sensor may be used in an optical navigation device capable of surface navigation and free space navigation. In one embodiment, the surface navigation sensor includes an image acquisition system, an image data decoder interface, surface navigation logic, and free space logic. The image acquisition system generates a surface navigation signal for surface navigation of the optical navigation device. The image data decoder interface decodes a free space navigation signal from a free space navigation sensor coupled to the surface navigation sensor. The surface navigation logic and free space navigation logic are coupled to the image data decoder interface and the image acquisition system. The surface navigation logic and the free space navigation logic process both the surface navigation signal and the free space navigation signal and send a processed navigation signal to a microcontroller coupled to the surface navigation sensor. Other embodiments of the surface navigation sensor are also described.

Embodiments of a method are also described. In one embodiment, the method is an optical navigation method for operating an optical navigation device in a surface navigation mode and a free space navigation mode. One embodiment of the method includes detecting an operating locality of a dual-mode optical navigation device relative to a navigation surface. The dual-mode optical navigation device is configured to operate in a surface navigation mode and a free space navigation mode. The method also includes generating a free space navigation signal representative of a free space navigation image of the navigation surface, encoding the free space navigation signal and transmitting the free space navigation signal to a surface navigation sensor, and processing the free space navigation signal at the surface navigation sensor to generate a processed free space navigation signal. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
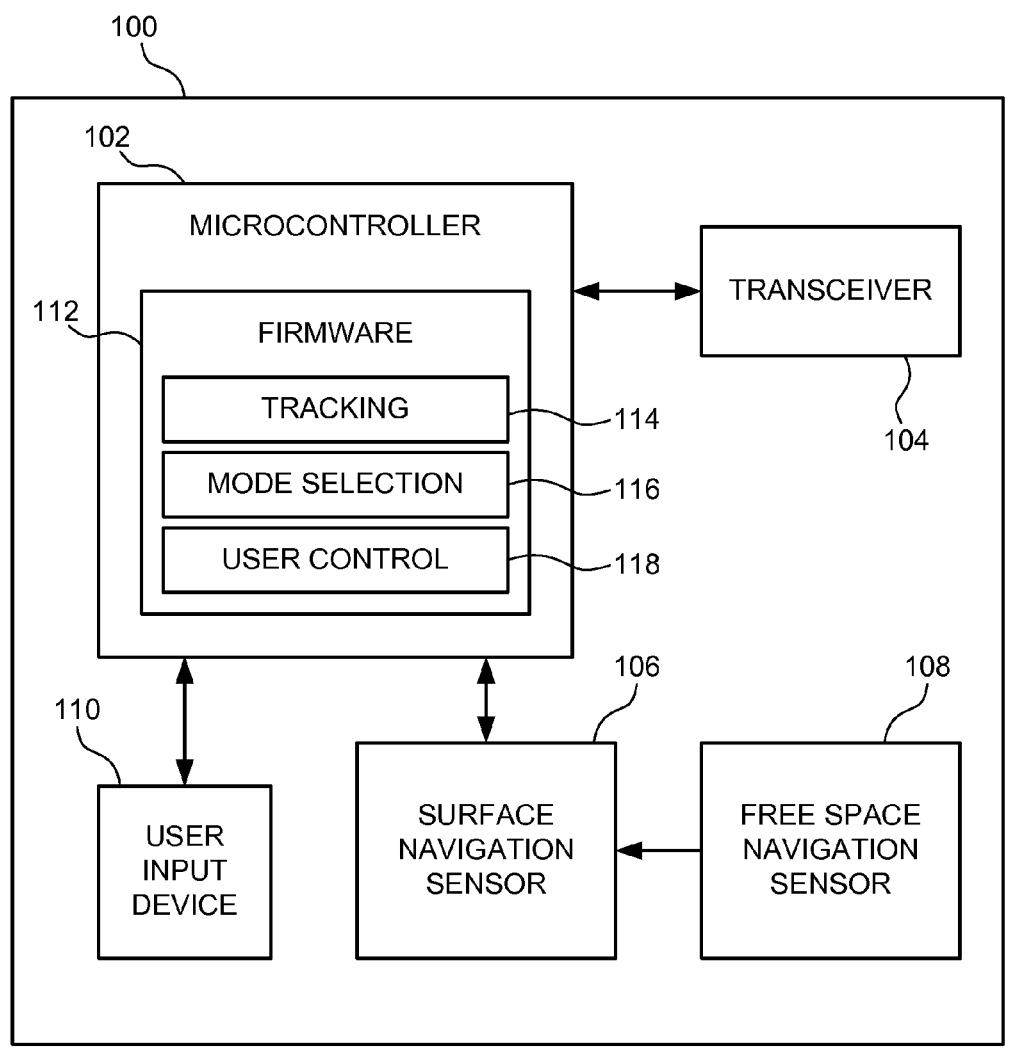
FIG. 1 depicts a schematic block diagram of one embodiment of an optical navigation device with surface navigation and free space navigation.

FIG. 1 depicts a schematic block diagram of one embodiment of an optical navigation device 100 with surface and free space navigation. In this way, the optical navigation device 100 facilitates an integrated optical navigation device capable of both surface (e.g., desktop) and free space (e.g., scene) navigation. It should be noted that the terms surface and free space do not necessarily designate a particular distance between the optical navigation device 100 and a navigation surface. In general, surface navigation occurs where surface features of the navigation surface are distinguishable, for example, using conventional surface navigation technology. Free space navigation begins at about the boundary where surface navigation performance decreases. However, surface and free space navigation zones are not necessarily mutually exclusive and may depend on the application for which the optical navigation device is designed and/or implemented.

The illustrated optical navigation device 100 includes a microcontroller 102, a transceiver 104, a surface navigation sensor 106, a free space navigation sensor 108, and a user input device 110. Although certain component parts are shown in the optical navigation device 100 of FIG. 1, other embodiments may include fewer or more component parts, or equivalent parts to perform fewer or more navigation functions. For example, some embodiments of the optical navigation device 100 may include a transmitter rather than the transceiver 104 for applications in which one-way data transmissions are sufficient. As another example, some embodiments of the optical navigation device 100 may implement more than two navigation sensors for different navigation applications.

In one embodiment, the microcontroller 102 controls the operation of the optical navigation device 100. For example, the microcontroller 102 sends signals to and processes various signals from the transceiver 104, the surface navigation sensor 106, and the user input device 110. In some embodiments, the microcontroller 102 also interfaces with the free space navigation sensor 108, for example, to set up operational parameters on the free space navigation sensor 108. However, the microcontroller 102 does not receive navigation signals from the free space navigation sensor 108, in the depicted embodiment.

Exemplary embodiments of the surface navigation sensor 106 and the free space navigation sensor 108 are shown and described in more detail with reference to FIGS. 2 and 3. However, it should be noted that the surface navigation sensor 106 may be used to facilitate a surface navigation mode such as desktop navigation, and the free space navigation sensor 108 may be used to facilitate a free space navigation mode such as scene navigation.

In the illustrated embodiment, the surface navigation sensor 106 is coupled to the microcontroller 102, and the free space navigation sensor 108 is coupled to the surface navigation sensor 106. In this embodiment, the free space navigation sensor 108 is configured to send free space navigation signals to the surface navigation sensor 106, which interfaces with the microcontroller 102 regarding all of the navigation signals from both the surface navigation sensor 106 and the free space navigation sensor 108. However, in an alternative embodiment, the free space navigation sensor 108 may be configured to receive and process surface navigation signals from the surface navigation sensor 106 and to interface with the microcontroller 102 regarding all of the navigation signals from both the surface navigation sensor 106 and the free space navigation sensor 108. Thus, in some embodiments, only one navigation sensor is used to interface with the microcontroller 102 regarding the navigation signals from multiple navigation sensors. In other embodiments, at least one navigation sensor interfaces with the microcontroller 102 via another navigation sensor, but does not send navigation signals directly to the microcontroller 102.

In one embodiment, the microcontroller 102 implements a variety of functions, including transmitting data to and receiving data from a host computer system (not shown) via the transceiver 104. The transceiver 104 may be a wireless transceiver or a wired transceiver.

The depicted microcontroller 102 includes firmware 112 which stores data and instructions to implement the various operations of the optical navigation device 100. The microcontroller 102 also includes logic to implement one or more algorithms related to the functionality of the optical navigation device 100. In one embodiment, the firmware 112 includes tracking logic 114, mode selection logic 116, and user control logic 118.

The tracking logic 114 implements an algorithm to track the location of the optical navigation device 100 according to one or more navigation signals originating from the surface navigation sensor 106 and/or the free space navigation sensor 108. Alternatively, the tracking logic 114 may implement different algorithms for each of the surface navigation mode and the free space navigation mode. The location information from the tracking logic 114 may be transmitted, for example, to a host computer (not shown) via the transceiver 104. In the illustrated embodiment, the tracking logic 114 is configured to process both surface navigation and free space navigation signals from the surface navigation sensor 106 in response to operation of the optical navigation device 100 in the surface navigation mode or the free space navigation mode, respectively. In an alternative embodiment, the tracking logic 114 is configured to process a both surface and free space navigation signal from the free space navigation sensor 108 in response to operation of the optical navigation device 100 in the surface navigation mode or the free space navigation mode, respectively.

In one embodiment, the mode selection logic 116 is configured to operate the optical navigation device 100 in either the surface navigation mode or the free space navigation mode. The mode selection logic 116 also may include an algorithm to determine which mode to implement at a given time. In one embodiment, the determination to implement either the surface navigation mode or the free space navigation mode may depend on a detector signal state (i.e., a lift state) of a lift detector, as described below.

The user control logic 118, like the mode selection logic 116, may implement different functionality depending on the navigation mode of the optical navigation device 100. In one embodiment, the user control logic 118 is configured to assign surface navigation functionality to the user input device 110 in response to operation of the optical navigation device 100 in the surface navigation mode. Similarly, the user control logic 118 is configured to assign free space navigation functionality to the user input device 110 in response to operation of the optical navigation device 100 in the free space navigation mode. The user input device 110 may be any combination of user input tools such as buttons, scroll wheels, sliders, and so forth. In this way, the user control logic 118 allows a user to implement different functionality for a particular user input device 110 depending on whether the optical navigation device 100 operates in the surface navigation mode or the free space navigation mode. For example, the user control logic 118 may assign a "selection" function to a button in the surface navigation mode, and may assign an "advance" function to the same button when the optical navigation device 100 operates in the free space navigation mode. However, these functions are merely exemplary and any combination of functions may be implemented with the surface and the free space navigation modes for a given user input device 110.

Figure 2:
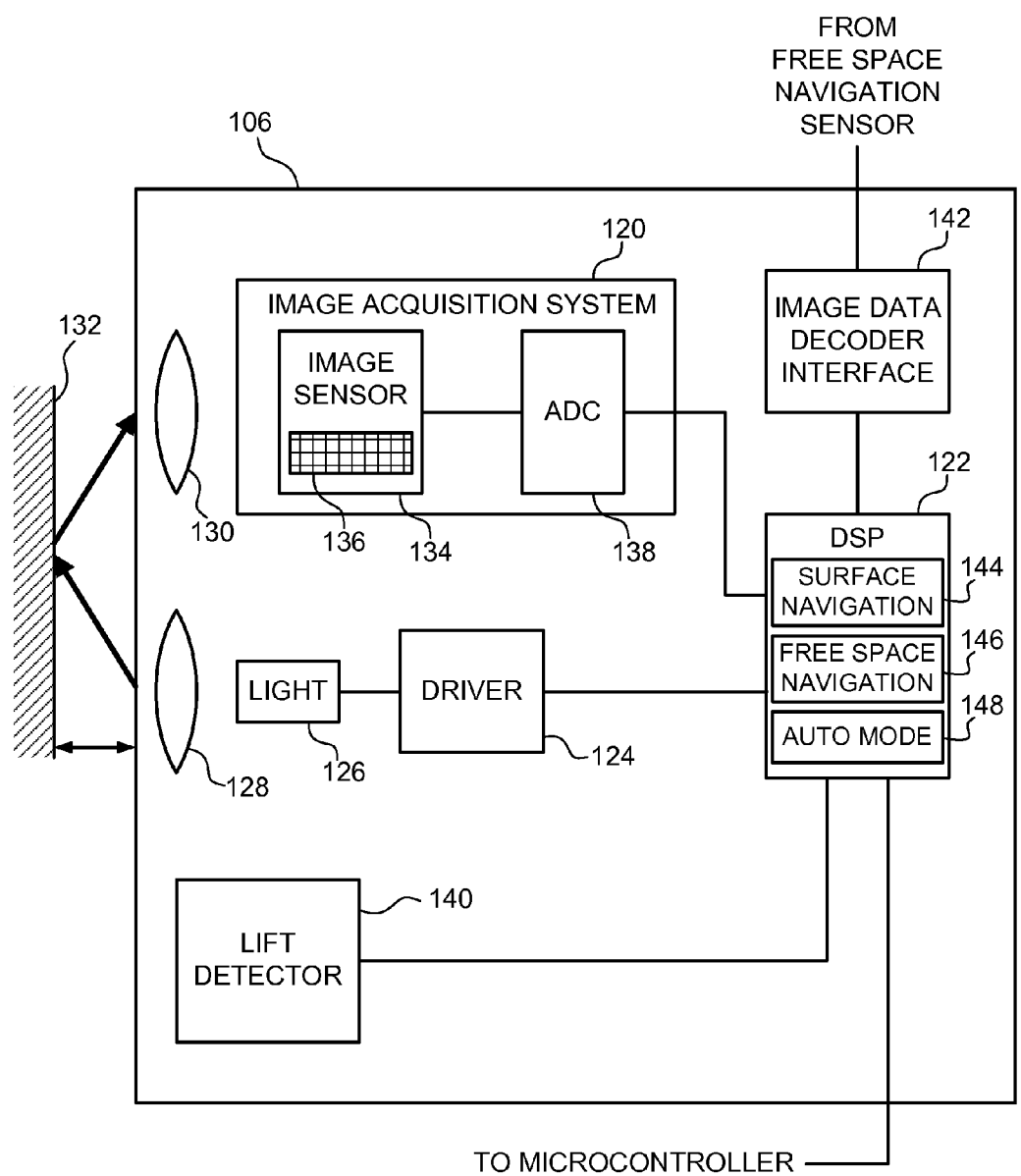
FIG. 2 depicts a schematic block diagram of one embodiment of a surface navigation sensor for use with the optical navigation device of FIG. 1.

FIG. 2 depicts a schematic block diagram of one embodiment of a surface navigation sensor 106 for use with the optical navigation device 100 of FIG. 1. Although the surface navigation sensor 106 is described in conjunction with the optical navigation device 100 of FIG. 1, some embodiments of the surface navigation sensor 106 may be implemented with other types of optical navigation devices. Moreover, some embodiments of the surface navigation sensor 106 may be implemented with non-optical navigation devices.

The illustrated surface navigation sensor 106 includes an image acquisition system (IAS) 120, a digital signal processor (DSP) 122, a light source driver 124, and a light source 126. The surface navigation sensor 106 also may include one or more optical elements 128 and 130. Other embodiments of the surface navigation sensor 106 may include fewer or more components. For example, some embodiments of the surface navigation sensor 106 may exclude one or more of the optical elements 128 and 130.

In one embodiment, the light source driver 124 controls the operation of the light source 126 (e.g., using a driver signal) to generate a light signal that is transmitted through the optical element 128 to a navigation surface 132. The reflected light signal is then received through the imaging optical element 130 and detected by the image acquisition system 120. In one embodiment, the light source 126 is a light emitting diode (LED). In another embodiment, the light source 126 is a laser. In another embodiment, the light source 126 could be any coherent or incoherent light source.

It should be noted that the distance between the surface navigation sensor 106 and the navigation surface 132 may vary depending on the application for which the surface navigation sensor 106 is used. In surface applications, the surface navigation sensor 106 may be relatively close to the navigation surface 132. For example, the surface navigation sensor 106 may be in physical contact with the navigation surface 132, or may be within a few millimeters of the navigation surface 132.

The depicted image acquisition system 120 includes an image sensor 134, which includes a pixel array 136. The image acquisition system 120 also includes an analog-to-digital converter (ADC) 138. In one embodiment, the image sensor 134 generates a plurality of electrical signals corresponding to incident light at the pixel array 136. Each of the generated electrical signals corresponds to one of the picture elements (or pixels) of the pixel array 136. In one embodiment, each pixel is a photosensor or other photosensitive device. The light signal reflected from the navigation surface 132 is imaged on the pixel array 136. In one embodiment, the optical element 130 facilitates resolution of microscopic surface images at the pixel array 136. The image sensor 134 then transmits the plurality of electrical signals to the analog-to-digital converter 138. The analog-to-digital converter 138 converts the plurality of electrical signals from analog signals to digital signals and then passes the digital signals to the digital signal processor 122.

After the digital signal processor 122 receives the digital form of the electrical signals from the analog-to-digital converter 138 of the image acquisition system 120, the digital signal processor 122 may perform additional processing using the electrical signals. Alternatively, instead of receiving signals from the image acquisition system 120, the digital signal processor 122 may receive signals from the free space navigation sensor 108 via an image data decoder interface 142. The image data decoder interface 142 receives an encoded representation of a free space navigation signal from the free space navigation sensor 108. The image data decoder interface 142 also decodes the encoded free space navigation signal for processing at the surface navigation sensor 106.

In one embodiment, the digital signal processor 122 includes surface navigation logic 144, free space navigation logic 146, and auto mode logic 148. The auto mode logic 148 is described in more detail below with reference to the lift detector 140. The surface navigation logic 144 processes a surface navigation signal from the image acquisition system 120 of the surface navigation sensor 106. Similarly, the free space navigation logic 146 processes a free space navigation signal from the free space navigation sensor 108. The digital signal processor 122 then sends a processed navigation signal to the microcontroller 102.

The digital signal processor 122 transmits one or more signals to the microcontroller 102. Exemplary types of signals transmitted from the digital signal processor 122 of the surface navigation sensor 106 to the microcontroller 102 include channel quadrature signals based on $\Delta x$ and $\Delta y$ relative displacement values. These signals, or other signals, may be indicative of a movement of the optical navigation device 100 relative to the navigation surface 132 or an imaged scene. Other embodiments of the digital signal processor 122 may transmit other types of signals to the microcontroller 102. As described above, the microcontroller 102 implements a variety of functions, including transmitting data to and receiving data from a host computer system (not shown).

In one embodiment, the surface navigation sensor 106 also includes a lift detector 140. The lift detector 140 may be fabricated on-chip with the image acquisition system 120 or, alternatively, the in another part of the optical navigation device 100 separate from the surface navigation sensor 106. In another embodiment, the image acquisition system 120 may provide lift detection information, instead of implementing a separate lift detector 140. In some embodiments, another type of proximity sensor may be implemented instead of the lift detector 140.

The lift detector 140 is configured to change a detector signal state in response to detection of a transition of the optical navigation device 100 from a surface locality to a free space locality relative to a navigation surface 132. However, changing the detector signal state does not necessarily require that a detector signal be generated for each state (i.e., surface and free space) of the optical navigation device 100. Moreover, the lift detector 140 may simply generate a pulse signal, rather than a continuous signal, to indicate the transition of the optical navigation device 100 from surface locality to free space locality, or from free space locality to surface locality. From this description, it can be seen that the lift detector 140 may implement various forms of detector signals, depending on the design considerations and application constraints associated with a particular embodiment.

The automatic mode logic 148 of the digital signal processor 122 implements one of the navigation modes in response to the lift state of the optical navigation device 100. Exemplary navigation modes include the surface navigation mode and the free space navigation mode, as described above. Based on the mode implemented by the auto mode logic 148, the digital signal processor 122 may process incoming electrical signals using either the surface navigation logic 144 or the free space navigation logic 146.

Figure 3:
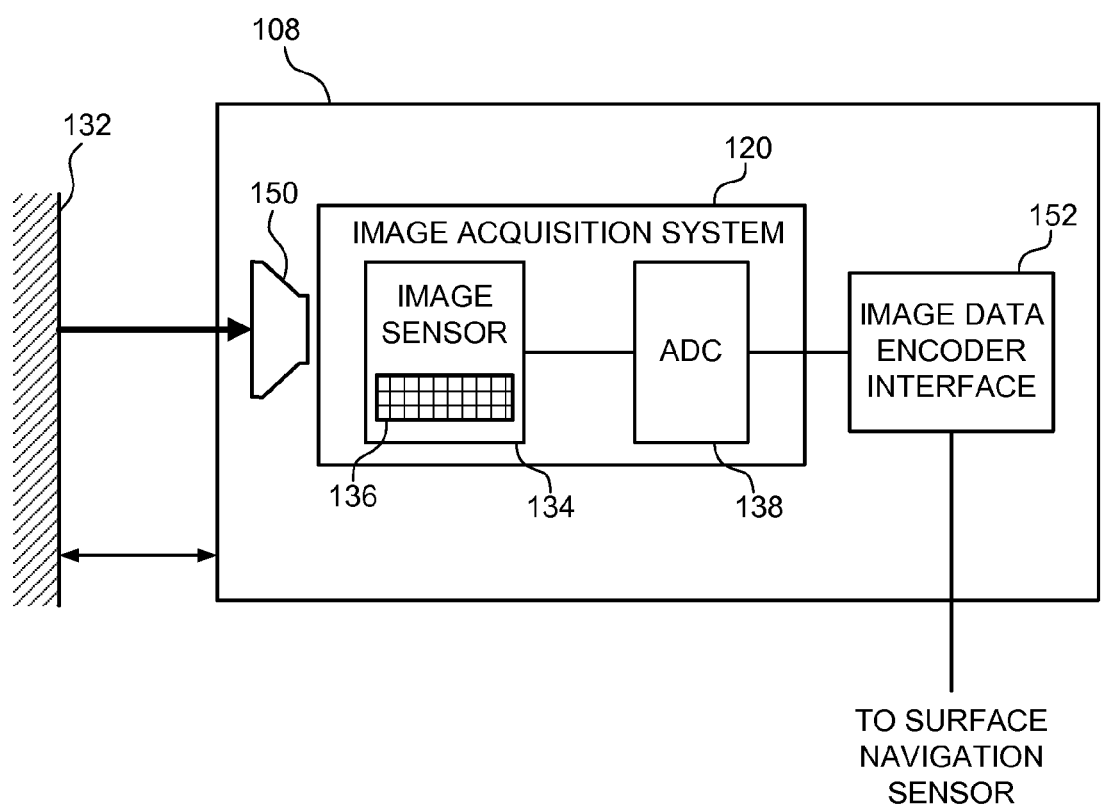
FIG. 3 depicts a schematic block diagram of one embodiment of a free space navigation sensor for use with the optical navigation device of FIG. 1.

FIG. 3 depicts a schematic block diagram of one embodiment of a free space navigation sensor 108 for use with the optical navigation device 100 of FIG. 1. Although the free space navigation sensor 108 is described in conjunction with the optical navigation device 100 of FIG. 1, some embodiments of the free space navigation sensor 108 may be implemented with other types of optical or non-optical navigation devices.

The illustrated free space navigation sensor 108 includes some of the same or similar components as the surface navigation sensor 106. These components are configured to operate in substantially the same manner described above, except as noted below. Additionally, in free space applications, the optical navigation device 100 may be relatively far from the navigation surface 132. For example, the optical navigation device 100 may operate outside of the surface navigation optical range.

The free space navigation sensor 108 also includes an optical element 150 and an image data encoder interface 152. In one embodiment, the optical element 150 is configured to image a free space object such as the navigation surface 132 onto the pixel array 136. In one embodiment, the optical element 150 is a wide angle lens. In another embodiment, the optical element 150 is a telecentric lens or another type of optical lens. In some embodiments, a beam splitter, a polarization element, or other filters may be used in conjunction with the optical element 150. In one embodiment, the image data encoder interface 152 encodes the second navigation signal for transmission to the surface navigation sensor 106. Various types of data encoding protocols may be used.

Figure 4:
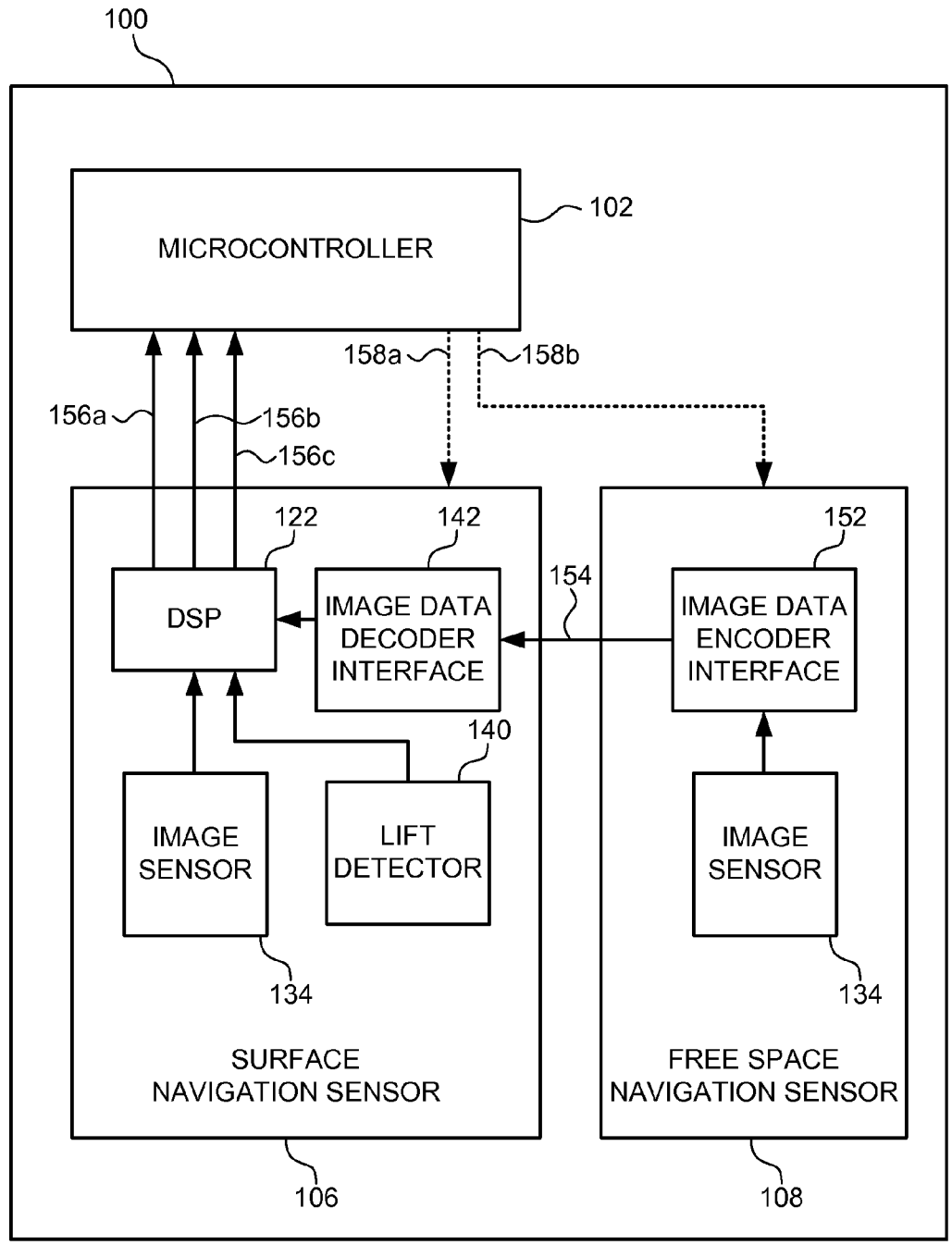
FIG. 4 depicts a schematic block diagram of another embodiment of an optical navigation device for processing free space navigation signals at the surface navigation sensor.

FIG. 4 depicts a schematic block diagram of another embodiment of an optical navigation device 100 for processing free space navigation signals at the surface navigation sensor 106. In particular, the illustrated optical navigation device 100 includes some of the components of the optical navigation device 100 of FIG. 1, the surface navigation sensor 106 of FIG. 2, and the free space navigation sensor 108 of FIG. 3. Other components may be implemented, but are omitted from FIG. 4 for clarity.

The illustrated optical navigation device 100 includes the microprocessor 102, the surface navigation sensor 106, and the free space navigation sensor 108. The surface navigation sensor 106 includes the digital signal processor 122, the image sensor 134 for surface navigation, the lift detector 140, and the image data decoder interface 142. The free space navigation sensor 108 includes the image sensor 134 for free space navigation and the image data encoder interface 152.

In one embodiment, the surface navigation sensor 106 implements precise tracking on a desktop surface or other navigation surface 132 relatively close to the surface navigation sensor 106. As shown in FIG. 2 and explained above, the surface navigation sensor 106 may include a light source 126 (e.g., LED or laser) to illuminate the navigation surface 132 and optics 130 to direct reflected light back toward the image sensor 134 for detection of a surface navigation image. The digital signal processor 122 then applies a surface navigation algorithm to the surface navigation image, as described above.

The free space navigation sensor 106 implements free space navigation, for example, using a wide angle lens 150 to provide raw image data from a far field scene (i.e., off a desktop). The free space navigation image is detected by the image sensor 134 of the free space navigation sensor 108, and the raw image data is transferred in real time by the image data encoder interface 152 to the image data decoder interface 142 of the surface navigation sensor 106. In one embodiment, the raw image data for the free space navigation image is transferred via a communication channel 154 (e.g., a single line or a bus) between the image data encoder interface 152 and the image data decoder interface 142. In other words, the image data encoder interface encodes 152 and drives the raw image data. The digital signal processor 122 then applies, at the surface navigation sensor 106, a free space navigation algorithm to the free space navigation image acquired by the free space navigation sensor 108.

The digital signal processor 122 also invokes the auto mode logic 108, described above, to switch between the surface navigation mode and the free space navigation mode based on the lift detection status of the lift detector 140. The lift detector 140 may be implemented on-chip with the surface navigation sensor 106 or, alternatively, off-chip and separate from the surface navigation sensor 106. For example, the lift detector 140 may be implemented as an external lift detection system using an infrared (IR) emitter and detector system.

The surface navigation sensor 106 then sends the navigation information to the microcontroller 102. In one embodiment, the navigation information is transferred via a navigation information communication channel 156a. The surface navigation sensor 106 also may transfer lift detection information to the microcontroller 102 via a lift detection communication channel 156b. The surface navigation sensor 106 also may transfer auto mode information to the microcontroller 102 via an auto mode communication channel 156c. Each of the communication channels 156 from the surface navigation sensor 106 to the microcontroller 102 may be implemented as a single line or as a bus.

In some embodiments, the optical navigation device 100 also includes control communication channels 158a and 158b from the microcontroller 102 to the surface navigation sensor 106 and the free space navigation sensor 108. In this way, the microcontroller 102 may communicate with the surface navigation sensor 106 to set up any parameters at the surface navigation sensor 106. Similarly, the microcontroller 102 may communicate with the free space navigation sensor 108 to set up any parameters at the free space navigation sensor 108. Additionally, the microcontroller 102 may have one or more algorithms in the firmware 112 of the microcontroller 102 to customize system parameters for surface navigation or free space navigation based on the mode the system is in (e.g., as determined by the auto mode logic 148 of the surface navigation sensor 106).

In another embodiment, the optical navigation device 100 also includes a manual mode switch (not shown) and an accompanying algorithm to allow a user to initiate a switch between the surface and free space navigation modes. In this embodiment, the optical navigation device 100 may be configured to revert back to automatic mode selection using the lift detector 140 after a period of time.

Figure 5:
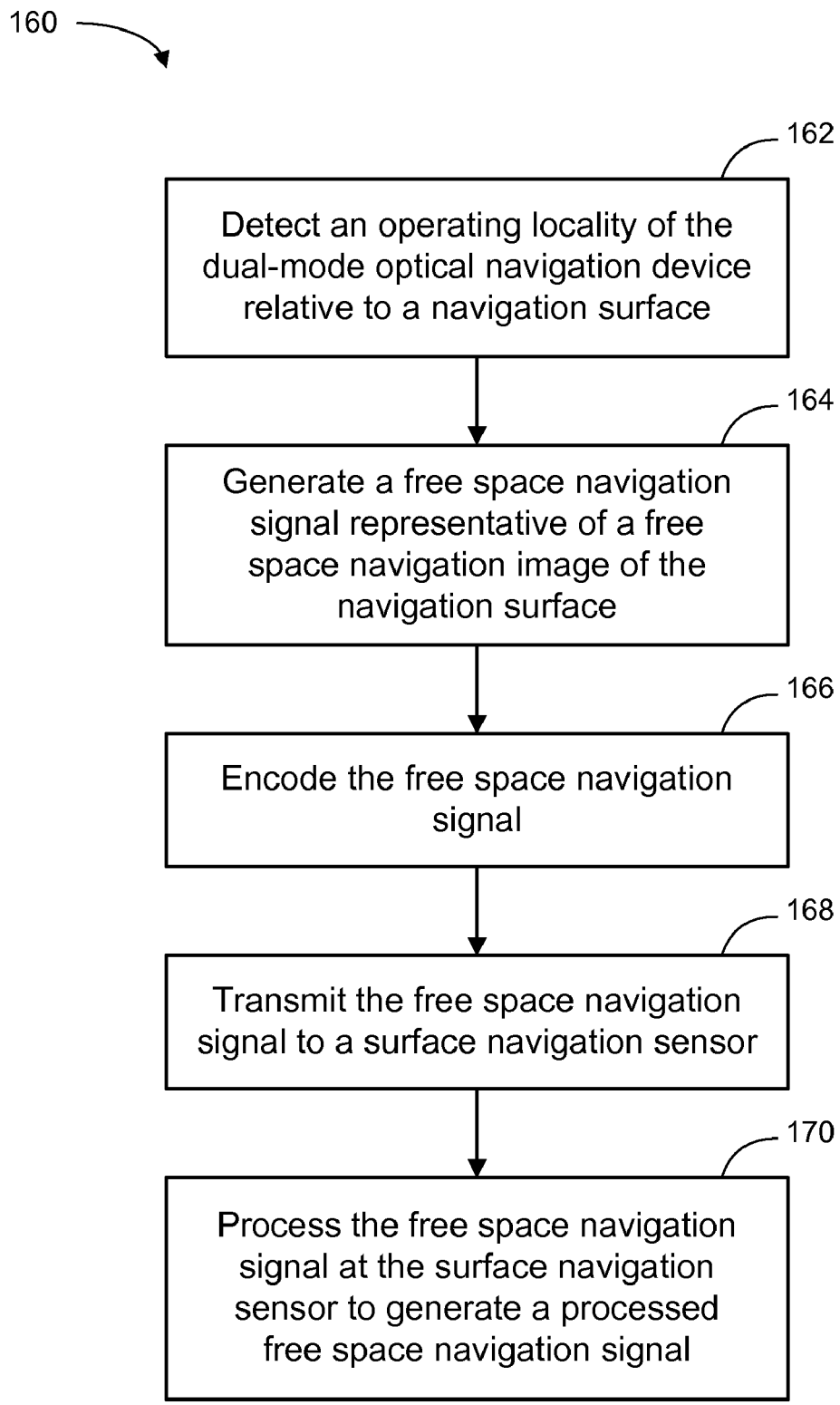
FIG. 5 depicts a schematic flow chart diagram of one embodiment of an optical navigation method for the optical navigation device of FIG. 1.

FIG. 5 depicts a schematic flow chart diagram of one embodiment of an optical navigation method 160 for the optical navigation device 100 of FIG. 1. Although the optical navigation method 160 is described in conjunction with the optical navigation device 100 of FIG. 1, some embodiments of the optical navigation method 160 may be implemented with other types of optical navigation devices. Additionally, although the present description refers to a dual-mode optical navigation device 100 which implements surface and free space navigation modes, other multimode optical navigation devices with other modes or more than two modes may be used in the depicted optical navigation method 160.

At block 162, the dual-mode optical navigation device 100 detects an operating locality of the optical navigation device 100 relative to a navigation surface 132. At block 164, the free space navigation sensor 108 generates a free space navigation signal representative of a free space navigation image of the navigation surface 132. Then, at block 166 the image data encoder interface 152 of the free space navigation sensor 108 encodes the free space navigation signal and, at block 168, transmits the free space navigation signal to the surface navigation sensor 106. At block 170, the surface navigation sensor 106 processes the free space navigation signal to generate a processed free space navigation signal, which may be communicated to the microcontroller 102 or used in another manner. The depicted optical navigation method 160 then ends.

Figure 6:
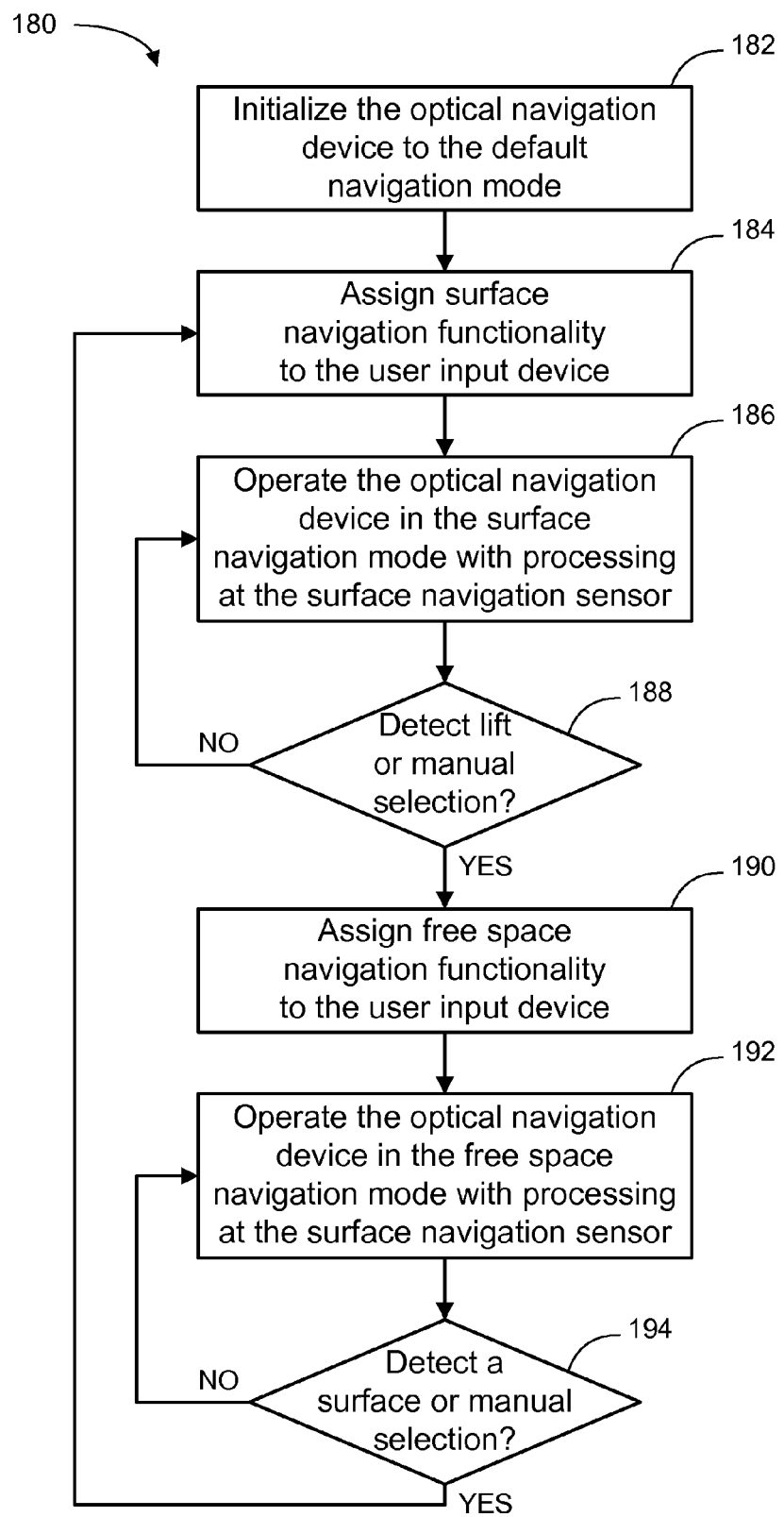
FIG. 6 depicts a schematic flow chart diagram of one embodiment of a mode switching method for the optical navigation device of FIG. 1.

FIG. 6 depicts a schematic flow chart diagram of one embodiment of a mode switching method 180 for the optical navigation device 100 of FIG. 1. Although the mode switching method 180 is described in conjunction with the optical navigation device 100 of FIG. 1, some embodiments of the mode switching method 180 may be implemented with other types of optical navigation devices.

At block 182, the mode selection logic 116 initializes the optical navigation device 100 to a default navigation mode. In one embodiment, the default navigation mode is the surface navigation mode. Alternatively, the mode selection logic 116 may initialize the optical navigation device 100 to an application-specific mode, depending on the detected operating environment of the optical navigation device 100.

Assuming the surface navigation mode is the default navigation mode, at block 184 the user control logic 118 assigns surface navigation functionality to the user input device 110. At block 186, the optical navigation device 100 operates in the surface navigation mode with processing occurring at the surface navigation sensor 106. In other words, the surface navigation image data is processed by the digital signal processor 122 at the surface navigation sensor 106. The optical navigation device 100 continues to operate in the surface navigation mode until the lift detector 140 detects lift beyond a threshold, at block 188. Alternatively, the image sensor 134 of the surface navigation sensor 106 is configured to detect the lift.

In response to detection of lift, at block 190 the user control logic 118 assigns free space navigation functionality to the user input device 110. At block 192, the optical navigation device 100 operates in the free space navigation mode with processing occurring at the surface navigation sensor 106. In other words, the free space navigation image data is also processed by the digital signal processor 122 at the surface navigation sensor 106, rather than at the free space navigation sensor 108. The optical navigation device 100 continues to operate in the free space navigation mode until the lift detector 140 detects a navigation surface 132, at block 194. Alternatively, the image sensor 134 of the surface navigation sensor 106 is configured to detect the navigation surface 132. Using these or similar operations, the optical navigation device 100 may automatically and/or manually alternate between operation in the surface and free space navigation modes. The depicted mode switching method 180 then ends.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical navigation device comprising:
   a microcontroller to process a movement of the optical navigation device;
   a first navigation sensor coupled to the microcontroller, the first navigation sensor to generate a first navigation signal in a first navigation mode, wherein the first navigation sensor comprises a surface navigation sensor to generate a surface navigation signal in response to detection of a surface navigation image; and
   a second navigation sensor coupled to the first navigation sensor, the second navigation sensor to generate a second navigation signal in a second navigation mode and to send the second navigation signal to the first navigation sensor, wherein the second navigation sensor comprises a free space navigation sensor to generate a free space navigation signal in response to detection of a free space navigation image.

2. The optical navigation device of claim 1, wherein the first navigation sensor is further configured to process both the first and second navigation signals and to send a processed navigation signal to the microcontroller.

3. The optical navigation device of claim 2, wherein:
   the second navigation sensor comprises an image data encoder interface to encode the second navigation signal for transmission to the first navigation sensor; and
   the first navigation sensor comprises an image data decoder interface to receive the encoded second navigation signal from the image data encoder interface and to decode the encoded second navigation signal for processing at the first navigation sensor.

4. The optical navigation device of claim 2, further comprising a lift detector coupled to the first navigation sensor, the lift detector to generate a lift detection signal indicative of a lift state of the optical navigation device, wherein the first navigation sensor is further configured to implement one algorithm of a surface navigation algorithm and a free space navigation algorithm to generate the processed navigation signal based on the lift state of the optical navigation device.

5. The optical navigation device of claim 4, wherein the first navigation sensor is further configured to automatically switch between a surface navigation mode and a free space navigation mode based on the lift state of the optical navigation device.

6. The optical navigation device of claim 4, wherein the lift detector is integrated on-chip with the first navigation sensor.

7. The optical navigation device of claim 1, wherein the first and second navigation signals comprise the surface navigation signal and the free space navigation signal.

8. The optical navigation device of claim 1, wherein the microcontroller comprises:
   mode selection logic to operate the optical navigation device in either the surface navigation mode or the free space navigation mode;
   tracking logic coupled to the mode selection logic, the tracking logic to process a processed navigation signal based on one signal of the first and second navigation signals; and
   user control logic coupled to the mode selection logic, the user control logic to assign surface navigation functionality to a user input device in response to operation of the optical navigation device in a surface navigation mode, and to assign free space navigation functionality to the user input device in response to operation of the optical navigation device in a free space navigation mode.

9. The optical navigation device of claim 1, further comprising a light source to generate and emit light toward a navigation surface, wherein the light source comprises a light emitting diode (LED) or a laser.

10. An optical navigation method comprising:
    detecting an operating locality of a dual-mode optical navigation device relative to a navigation surface, wherein the dual-mode optical navigation device is configured to operate in a surface navigation mode and a free space navigation mode;
    generating a free space navigation signal representative of a free space navigation image of the navigation surface;
    encoding the free space navigation signal and transmitting the free space navigation signal to a surface navigation sensor; and
    processing the free space navigation signal at the surface navigation sensor to generate a processed free space navigation signal.

11. The optical navigation method of claim 10, further comprising decoding the free space navigation signal at the surface navigation sensor prior to processing the free space navigation signal at the surface navigation sensor.

12. The optical navigation method of claim 10, further comprising automatically switching between the surface navigation mode and the free space navigation mode based on the operating locality of the dual-mode optical navigation device relative to the navigation surface.

13. The optical navigation method of claim 10, further comprising:
    generating a surface navigation signal representative of a surface navigation image of the navigation surface; and
    processing the surface navigation signal at the surface navigation sensor to generate a processed surface navigation signal.

14. The optical navigation method of claim 10, further comprising transferring image data corresponding to the free space navigation image from a free space navigation sensor to the surface navigation sensor in real time.

* * * * *